United States Patent
Song

(10) Patent No.: US 11,644,943 B2
(45) Date of Patent: May 9, 2023

(54) METHOD FOR ICON DISPLAY, TERMINAL, AND STORAGE MEDIUM

(71) Applicant: GUANGDONG OPPO MOBILE TELECOMMUNICATIONS CORP., LTD., Guangdong (CN)

(72) Inventor: Fang Song, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/181,790

(22) Filed: Feb. 22, 2021

(65) Prior Publication Data

US 2021/0173549 A1 Jun. 10, 2021

Related U.S. Application Data

(63) Continuation of application No. PCT/CN2019/096728, filed on Jul. 19, 2019.

(30) Foreign Application Priority Data

Aug. 22, 2018 (CN) .......................... 201810961446.9

(51) Int. Cl.
*G06F 3/04817* (2022.01)
*G06F 3/0482* (2013.01)
(Continued)

(52) U.S. Cl.
CPC ........ *G06F 3/04817* (2013.01); *G06F 3/0482* (2013.01); *G06F 3/0488* (2013.01);
(Continued)

(58) Field of Classification Search
None
See application file for complete search history.

(56) References Cited

U.S. PATENT DOCUMENTS 11,115,518 B2 * 9/2021 Chen .................... G06F 3/04817
2006/0218503 A1 9/2006 Matthews et al.
(Continued)

FOREIGN PATENT DOCUMENTS

CN 106020605 10/2016
CN 106293813 1/2017
(Continued)

OTHER PUBLICATIONS

Lagace, M. (Apr. 28, 2017). How to use game tools on the Samsung galaxy S8. Android Central. Retrieved Mar. 16, 2022 from https://www.androidcentral.com/how-use-game-tools-samsung-galaxy-s8 (Year: 2017).*

(Continued)

*Primary Examiner* — Linda Huynh
(74) *Attorney, Agent, or Firm* — Hodgson Russ LLP

(57) ABSTRACT

A method for icon display, a terminal, and a storage medium are provided. The method includes the following. A user interface of a game application is displayed. A display instruction is received, where the display instruction is used to request to display a sidebar. The sidebar is displayed in response to the display instruction. The sidebar includes a switch region, a shortcut function region, and a shortcut application region, where the switch region is used to display a switch icon corresponding to the game application, the shortcut function region is used to display a shortcut function icon corresponding to the game application, and the shortcut application region is used to display an icon of a target application.

13 Claims, 16 Drawing Sheets

(51) Int. Cl.
    *H04M 1/72463*    (2021.01)
    *G06F 3/0488*    (2022.01)
    *H04M 1/72454*    (2021.01)

(52) U.S. Cl.
    CPC . *H04M 1/724634* (2022.02); *A63F 2300/308* (2013.01); *H04M 1/72454* (2021.01)

(56) References Cited

U.S. PATENT DOCUMENTS

| | | | |
|---|---|---|---|
| 2010/0205557 | A1 | 8/2010 | Peterson |
| 2011/0145764 | A1* | 6/2011 | Higuchi ................ G06F 3/0482 715/835 |
| 2011/0209093 | A1 | 8/2011 | Hinckley et al. |
| 2014/0274399 | A1* | 9/2014 | Mahlmeister ........... A63F 13/25 463/37 |
| 2014/0317542 | A1* | 10/2014 | Kim ..................... G06F 3/0486 715/765 |
| 2016/0179341 | A1* | 6/2016 | Cho ..................... G06F 3/0486 715/769 |
| 2016/0306533 | A1* | 10/2016 | Agarwal ............. G06F 3/04845 |
| 2017/0046024 | A1* | 2/2017 | Dascola ................ G06F 3/0416 |
| 2018/0335921 | A1* | 11/2018 | Karunamuni ....... G06F 3/04842 |
| 2019/0042066 | A1* | 2/2019 | Kim ..................... G06F 3/1446 |
| 2019/0369700 | A1* | 12/2019 | Chen .................... G06F 1/1694 |
| 2020/0057596 | A1* | 2/2020 | Kim ......................... G06F 3/147 |
| 2020/0371666 | A1* | 11/2020 | Ni .......................... G06F 3/0488 |
| 2020/0374382 | A1* | 11/2020 | Chen ................. H04M 1/72403 |

FOREIGN PATENT DOCUMENTS

| | | |
|---|---|---|
| CN | 106354403 | 1/2017 |
| CN | 107102793 | 8/2017 |
| CN | 107844227 | 3/2018 |
| CN | 107890667 | 4/2018 |
| CN | 108021219 | 5/2018 |
| WO | 2014134939 | 9/2014 |
| WO | 2015139407 | 9/2015 |
| WO | WO-2019128190 A1 * | 7/2019 ......... G06F 3/04847 |

OTHER PUBLICATIONS

Mundhra, A. (Mar. 23, 2016). How to enable gaming tools on Samsung galaxy S7. Guiding Tech. Retrieved Mar. 16, 2022 from https://www.guidingtech.com/57404/enable-gaming-tools-galaxy-s7/ (Year: 2016).*

Summerson, C. (Jul. 12, 2017). What is Samsung's game launcher, and should you use it? How-To Geek. Retrieved Mar. 16, 2022 from https://www.howtogeek.com/262157/what-is-samsungs-game-launcher-and-should-you-use-it/ (Year: 2017).*

SIPO, First Office Action for CN Application No. 201810961446.9, dated Mar. 13, 2020.

WIPO, ISR for PCT/CN2019/096728, dated Sep. 27, 2019.

Digital Topic Society, "Not Game Phone but Stronger? Actually experience a wave of vivo NEX game mode 4.0" Jul. 2018, retrieved from: <https://www.souhu.com/a/240554228_289577>, 3 pages.

Huawei Terminal Guest Service, "Honor 10 has a game assistant," Apr. 2018, retrieved from: <https://zhidao.baidu.com/question/245936120103594644.html>, 1 page.

EPO, Extended European Search Report for EP Application No. 19852486.0, dated Sep. 22, 2021.

EPO, Communication for EP Application No. 19852486.0, dated Feb. 3, 2023.

* cited by examiner

US 11,644,943 B2

METHOD FOR ICON DISPLAY, TERMINAL, AND STORAGE MEDIUM

CROSS-REFERENCE TO RELATED APPLICATION(S)

This application is a continuation of International Application No. PCT/CN2019/096728, filed on Jul. 19, 2019, which claims priority to Chinese Patent Application No. 201810961446.9, filed Aug. 22, 2018, the entire disclosures of which are hereby incorporated by reference.

TECHNICAL FIELD

This disclosure relates to the technical field of terminals, and in particularly to a method for icon display, a terminal, and a storage medium.

BACKGROUND

Currently, when a user plays a game on a terminal such as a mobile phone or a tablet computer, the user can trigger display of a menu and perform some operations through the menu.

In the related art, when the game application is running in the foreground of the terminal, if the user performs a sliding operation on a side of a screen of the terminal, the terminal will display a menu according to the received sliding operation and display several preset function icons in the menu. For example, the function icons may include a flashlight icon, a Bluetooth icon, and the like.

SUMMARY

In an aspect, a method for icon display is provided. The method includes the following.

A user interface of a game application is displayed. A display instruction is received, where the display instruction is used to request to display a sidebar. The sidebar is displayed in response to the display instruction. The sidebar includes a switch region, a shortcut function region, and a shortcut application region, where the switch region is used to display a switch icon corresponding to the game application, the shortcut function region is used to display a shortcut function icon corresponding to the game application, and the shortcut application region is used to display an icon of a target application.

In another aspect, a terminal is provided. The terminal includes at least one processor and a non-transitory computer readable storage. The computer readable storage is coupled to the at least one processor and stores at least one computer executable instruction thereon which, when executed by the at least one processor, causes the at least one processor to execute the method of the first aspect.

In still another aspect, a computer-readable storage medium is provided. The non-transitory computer readable storage medium is configured to store a computer program which, when executed by a processor, causes the processor to execute the method of the first aspect.

DETAILED DESCRIPTION

To make objectives, technical solutions, and advantages of this application clearer, implementations of the application will be described in further detail below with reference to the accompanying drawings.

Figure 1:
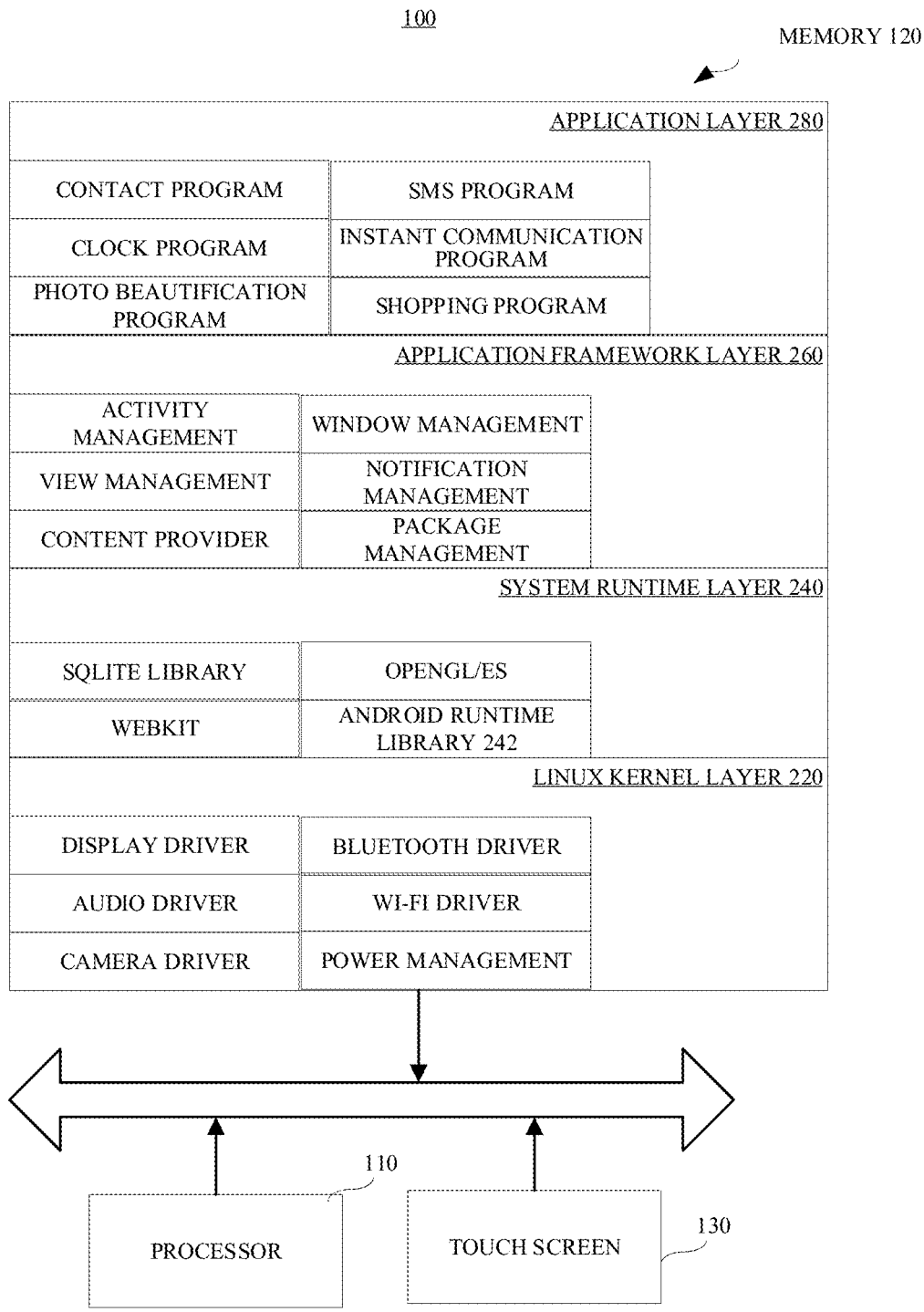
FIG. 1 is a structural schematic diagram illustrating a terminal according to implementations.
Figure 2:
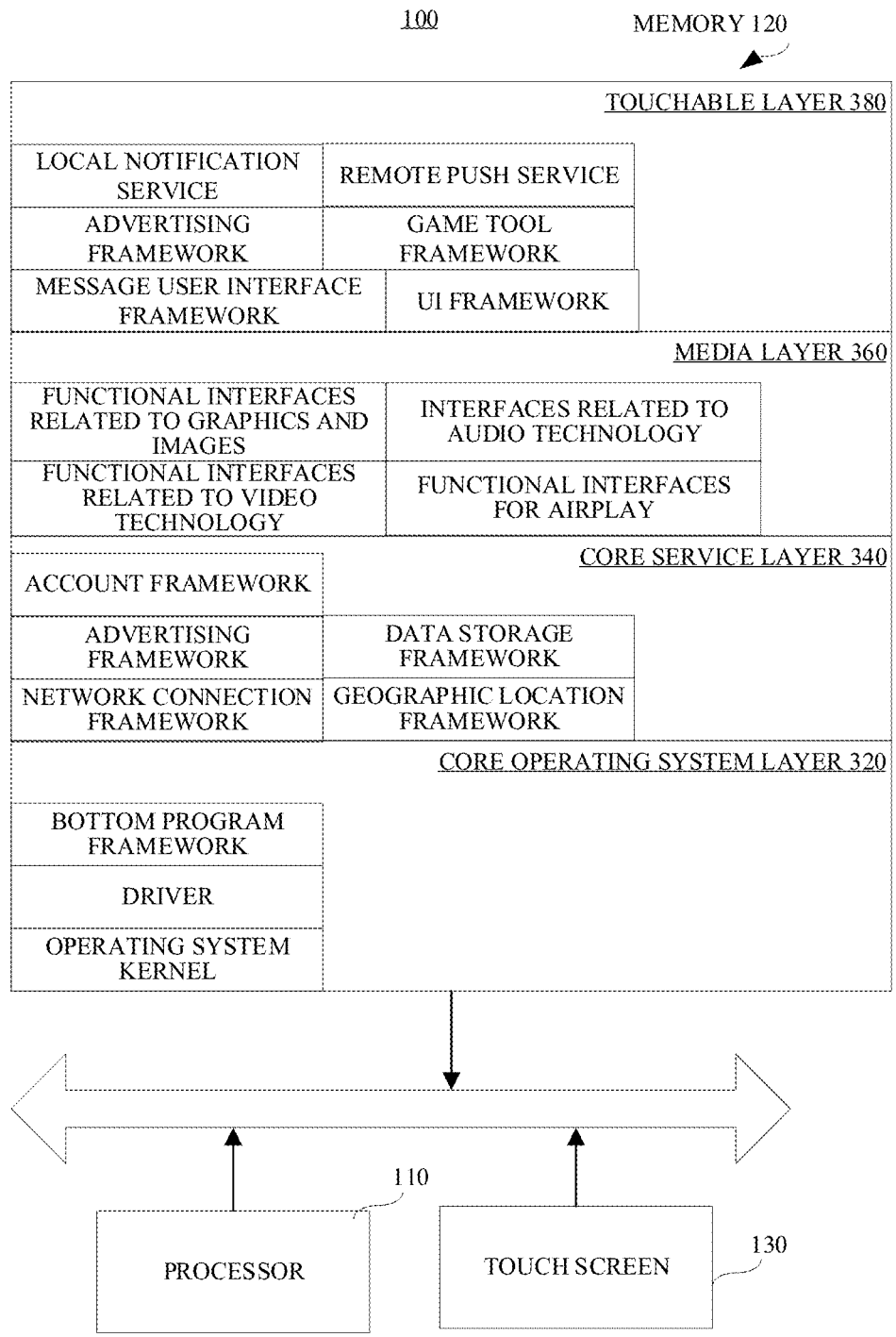
FIG. 2 is a structural schematic diagram illustrating a terminal according to other implementations.

FIGS. 1 and 2 each illustrate a structural block diagram of a terminal 100 according to an implementation. The terminal 100 may be a mobile phone, a tablet computer, a notebook computer, an e-book, or the like. The terminal 100 in the present disclosure may include one or more of the following components: a processor 110, a memory 120, and a touch screen 130.

The processor 110 may include one or more processing cores. The processor 110 is configured to connect various parts of the entire terminal 100 by using various interfaces and lines, execute or perform the instructions, programs, code sets, or instruction sets stored in the memory 120, and deploy the data stored in the memory 120, to execute various functions and processing data of terminal 100. In an example, the processor 110 may use at least one hardware form of digital signal processing (DSP), field-programmable gate array (FPGA), and programmable logic array (PLA) to implement. The processor 110 may integrate one or a combination of a central processing unit (CPU), a graphics processing unit (GPU), and a modem. The CPU is mainly configured to handle the operating system, user interface, and application programs; the GPU is responsible for rendering and drawing the content to be displayed by the touch screen 130; and the modem is used for processing wireless communication. It can be understood that the modem may not be integrated into the processor 110, and may be implemented by a single chip.

The memory 120 may include random access memory (RAM), and may also include read-only memory (ROM). In an example, the memory 120 includes a non-transitory computer-readable storage medium. The memory 120 may be used to store instructions, programs, codes, code sets, or instruction sets. The memory 120 may include a storage program region and a storage data region, where the storage program region may store instructions for implementing an operating system, instructions for at least one function (such as a touch function, a sound playback function, an image playback function, etc.), and instructions for implementing the following method implementations; the storage data region may store data (such as audio data, phone book) created according to the use of terminal 100.

Taking the operating system of an Android system as an example, the programs and data stored in the memory 120 are illustrated in FIG. 1. The memory 120 stores a Linux kernel layer 220, a system runtime layer 240, an application framework layer 260, and an application layer 280. The Linux kernel layer 220 provides underlying drivers for various hardware of the terminal 100, such as display drivers, audio drivers, camera drivers, Bluetooth drivers, Wi-Fi (wireless fidelity) drivers, power management, and so on. The system runtime layer 240 provides major feature support for the Android system through some C/C++ libraries. For example, the SQLite library provides support for database, the OpenGL/ES library provides support for 3D drawing, and the Webkit library provides support for browser kernel. The Android runtime library 242 is also provided in the system runtime layer 240, which mainly provides some core libraries for allowing developers to write Android applications using the Java language. The application framework layer 260 provides various APIs that may be used when building application programs. Developers can also use these APIs to build their own applications, such as activity management, window management, view management, notification management, content providers, package management, call management, resource management, and location management. There is at least one application running in the application layer 280. These applications can be contact programs, SMS programs, clock programs, camera applications, etc. that are native to the operating system; they can also be applications developed by third-party developers, such as instant communication programs, photo beautification programs, etc.

Taking the operating system of an IOS system as an example, the programs and data stored in the memory 120 are illustrated in FIG. 2. The IOS system includes: a core operating system layer 320, a core service layer 340, a media layer 360, and a touchable layer (also called Cocoa touch layer) 380. The core operating system layer 320 includes an operating system kernel, drivers, and underlying program frameworks. These underlying program frameworks provide functions closer to the hardware for use by the program framework located at the core service layer 340. The core service layer 340 provides system services and/or program frameworks required by the application program, such as a foundation framework, an account framework, an advertising framework, a data storage framework, a network connection framework, a geographic location framework, a motion framework, and so on. The media layer 360 provides audio-visual-related interfaces for applications, such as interfaces related to graphics and images, interfaces related to audio technology, interfaces related to video technology, and AirPlay interfaces for audio and video transmission technologies. The touchable layer 380 provides various commonly-used interface-related frameworks for application development. The touchable layer 380 is responsible for user touch interactive operations on the terminal 100. For example, a local notification service, a remote push service, an advertising framework, a game tool framework, a message user interface (UI) framework, a user interface UIKit framework, a map framework, and so on.

Among the frameworks illustrated in FIG. 2, frameworks related to most applications include, but are not limited to: a basic framework in the core service layer 340 and a UIKit framework in the touchable layer 380. The basic framework provides many basic object classes and data types, and provides the most basic system services for all applications, regardless of the UI. The classes provided by the UIKit framework are basic UI class libraries for creating touch-based user interfaces. IOS applications can provide UI based on the UIKit framework, so it provides the application's infrastructure for building user interfaces, drawing, handling and user interaction events, responding to gestures, and more.

The touch screen 130 is used for receiving a touch operation by a user using a finger, a touch pen, or any suitable object on or nearby, and a user interface displaying various applications. The touch screen 130 is usually disposed on the front panel of the terminal 100. The touch screen 130 may be designed as a full screen, a curved screen, or a special-shaped screen. The touch screen 130 can also be designed as a combination of a full screen and a curved screen, and a combination of a special-shaped screen and a curved screen, which is not limited herein.

Full Screen

Figure 3A:
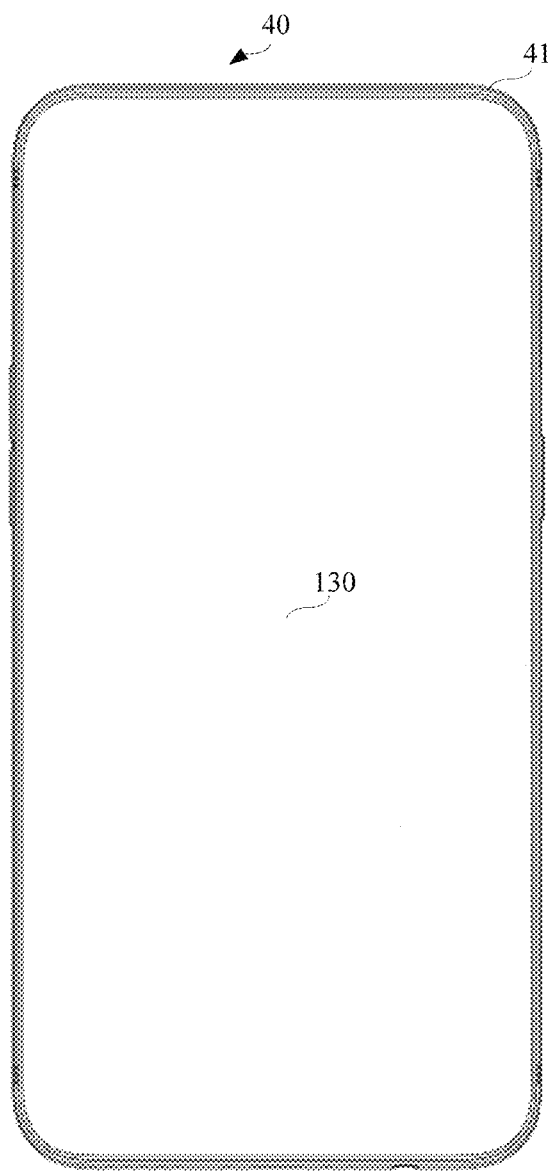
FIG. 3A to FIG. 3F are schematic diagrams illustrating terminals with different touch display screens according to implementations.

The full screen may refer to a screen design in which the touch screen 130 occupies the front panel of the terminal 100 with a screen ratio exceeding a threshold (such as 80% or 90% or 95%). One calculation method of the screen ratio is: (the area of the touch screen 130/the area of the front panel of the terminal 100)*100%; another way to calculate the screen ratio is: (the area of the actual display region in the touch screen 130/the area of the front panel of the terminal 100)*100%; yet another way to calculate the screen ratio is: (the diagonal of touch screen 130/the diagonal of the front panel of the terminal 100)*100%. In the example illustrated in FIG. 3A, almost all regions on the front panel of the terminal 100 are touch screen 130. On the front panel 40 of the terminal 100, all regions other than the edges generated by the middle frame 41 are all touch screen 130. The four corners of the touch screen 130 may be right-angled or rounded.

The full screen may also be a screen design in which at least one front panel component is integrated inside or below the touch screen 130. In an example, the at least one front panel component includes a camera, a fingerprint sensor, a proximity light sensor, a distance sensor, and the like. In some examples, other components on the front panel of the related terminal are integrated in all or part of the touch screen 130. For example, after the photosensitive element in the camera is split into multiple photosensitive pixels, the pixels are integrated in a black region in each display pixel in the touch screen 130. Since the at least one front panel component is integrated inside the touch screen 130, the full screen has a higher screen ratio.

In other examples, the front panel components on the front panel of the related terminal can also be set on the side or back of the terminal 100, such as placing an ultrasonic fingerprint sensor under the touch screen 130, or a bone-conducting earpiece inside the terminal 100, and the camera arranged on the side of the terminal in a pluggable structure.

In some examples, when the terminal 100 uses a full screen, a single side, or two sides (such as left and right sides), or four sides (such as top, bottom, left, and right sides) of the middle frame of the terminal 100 are provided with edge touch sensors. The edge touch sensors are used to detect at least one of a user's touch operation, click operation, press operation, and sliding operation on the middle frame. The edge touch sensor may be any one of a touch sensor, a thermal sensor, and a pressure sensor. The user can apply operations on the edge touch sensor to control applications in the terminal 100.

Curved Screen

Figure 3B:
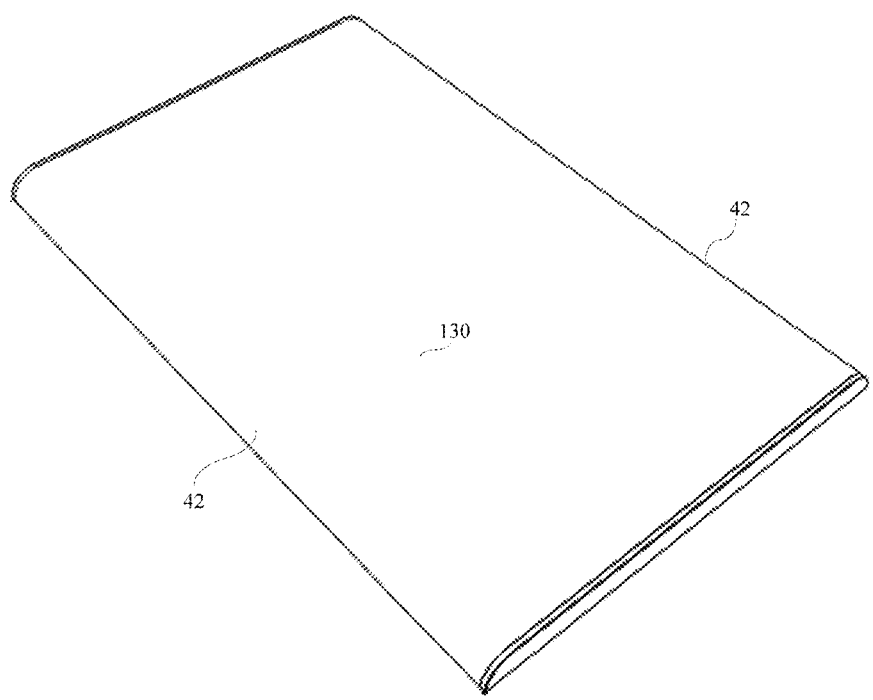

The curved screen refers to a screen design in which the cross-section of the touch display screen 130 is curved and the projection in a direction parallel to the cross-section is a plane. The curved shape may be U-shaped. In an example, the curved screen refers to a screen design manner in which at least one side is a curved shape. In an example, the curved screen refers to that at least one side of the touch screen 130 extends to cover the middle frame of the terminal 100. Since the side of the touch screen 130 extends to cover the middle frame of the terminal 100, the middle frame without the display function and the touch function is also covered as a displayable region and/or an operable region, so that the curved screen has a higher screen ratio. In an example, in the example illustrated in FIG. 3B, the curved screen refers to a screen design in which the left and right sides 42 are curved; or, the curved screen refers to a screen design in which the upper and lower sides are curved; or, curved screen refers to a screen design with four curved sides on the top, bottom, left, and right. In another example, the curved screen is made of a touch screen material with a certain flexibility.

Special-Shaped Screen

The special-shaped screen is a touch screen with an irregular shape. The irregular shape is not a rectangle or a rounded rectangle. In an example, the special-shaped screen refers to a screen design provided with protrusions, notches, and/or holes on the rectangular or rounded rectangular touch screen 130. In an example, the protrusion, the notch, and/or the hole can be located at the edge of the touch screen 130, the center of the screen, or both. When the protrusion, notch, and/or hole are set on one edge, they can be set at the middle position or both ends of the edge; when the protrusion, notch, and/or hole are set on the center of the screen, they can be set in one or more of the regions: the upper region, the upper left region, the left region, the lower left region, the lower region, the lower right region, the right region, and the upper right region of the screen. When arranged in multiple regions, the protrusions, the notches, and the holes can be distributed in a centralized or distributed manner; they can be distributed symmetrically or asymmetrically. The number of the protrusions, the notches, and/or the holes is not limited.

Because the special-shaped screen covers the upper and/or lower forehead region of the touch screen as a displayable region and/or an operable region, so that the touch-screen display takes up more space on the front panel of the terminal, having a larger screen ratio. In some examples, the notches and/or holes are used to receive at least one front panel component, which includes at least one of a camera, a fingerprint sensor, a proximity light sensor, a distance sensor, handset, an ambient light sensor, or physical buttons.

Figure 3C:
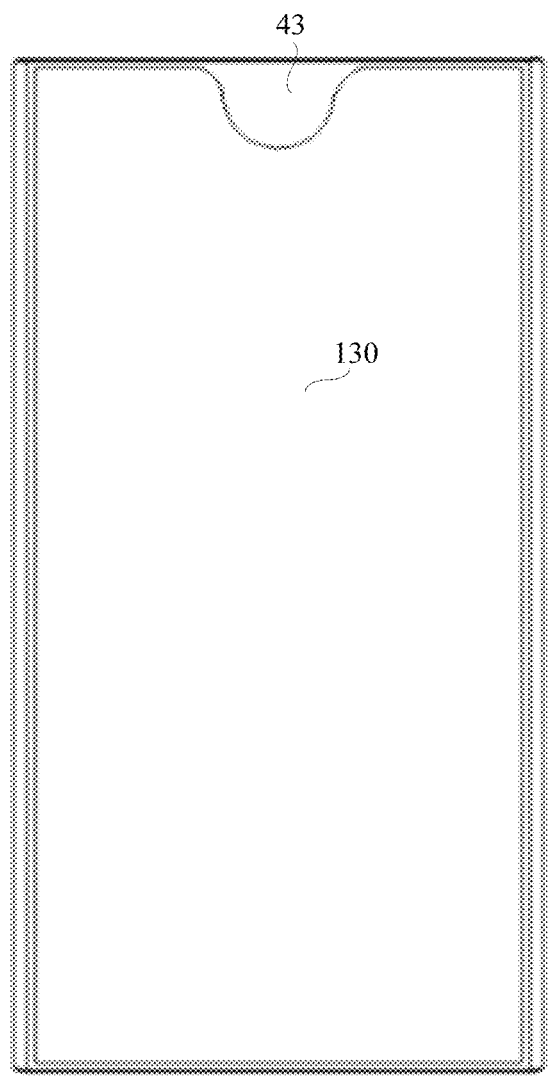
Figure 3D:
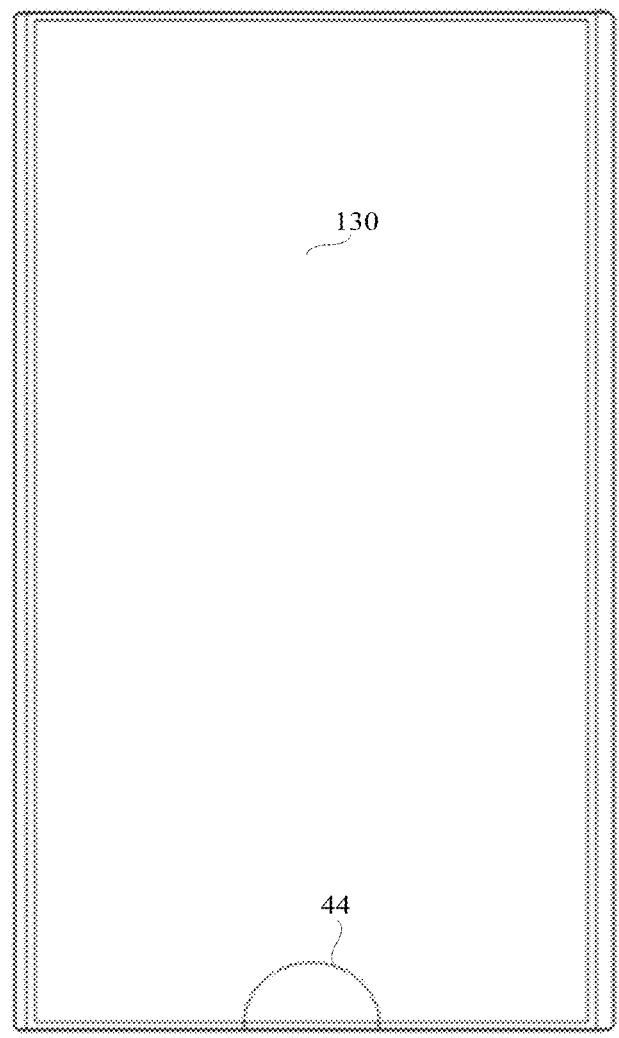
Figure 3E:
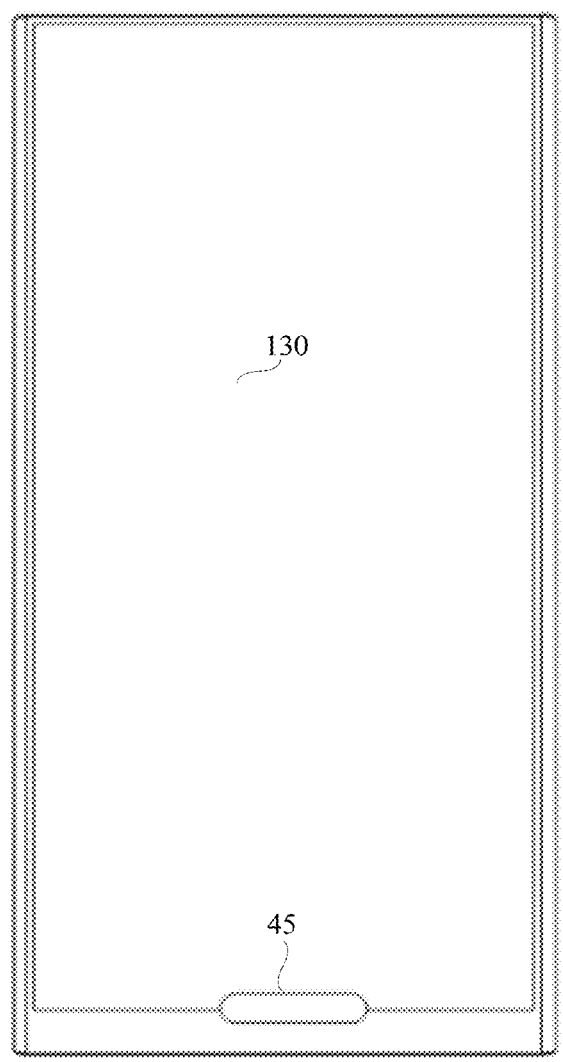
Figure 3F:
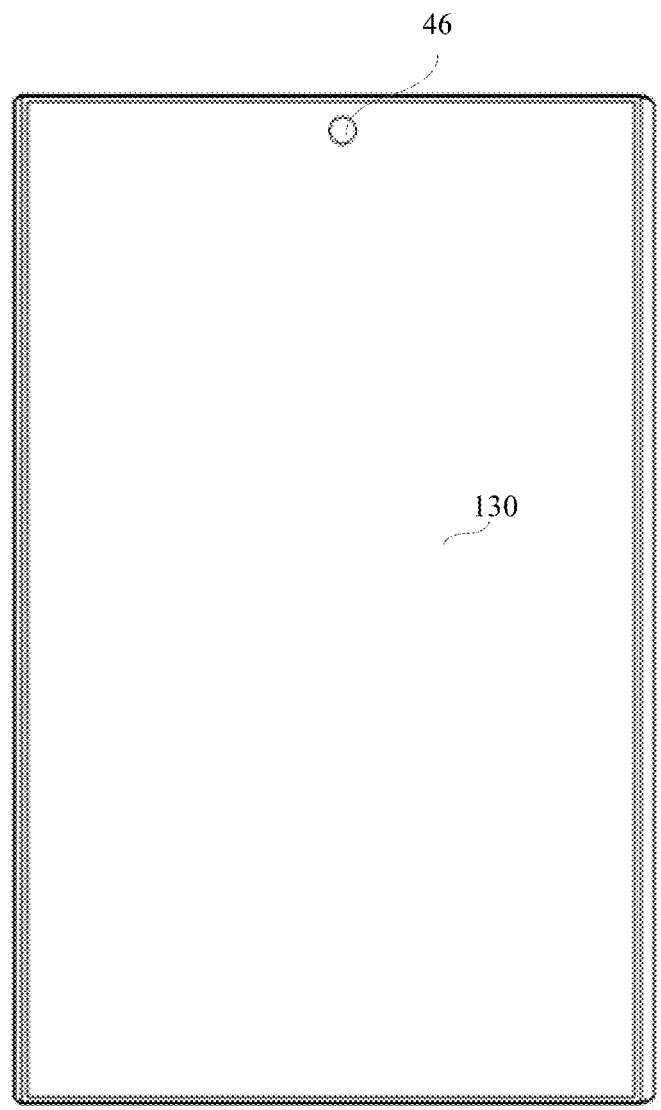

Schematically, the notch may be provided on one or more edges, and the notch may be a semi-circular notch, a right-angled rectangular notch, a rounded rectangular notch, or an irregularly-shaped notch. In the example illustrated schematically in FIG. 3C, the special-shaped screen may be a screen design provided with a semi-circular notch 43 at the center of the upper edge of the touch screen 130. The space vacated by the semi-circular notch 43 is used for accommodating at least one front panel component of a camera, a distance sensor (also known as a proximity sensor), a handset, and an ambient light brightness sensor. As illustrated in FIG. 3D, the special-shaped screen may be designed that a semi-circular notch 44 is located on the central position of the lower edge of the touch screen 130. The space vacated by the semi-circular notch 44 is used to accommodate at least one component of a physical button, a fingerprint sensor, and a microphone. As illustrated in the example of FIG. 3E, the special-shaped screen may be a screen design provided with a semi-elliptical notch 45 in the center of the lower edge of the touch screen 130. A semi-elliptical notch is formed on the front panel of the terminal 100, and two semi-elliptical notches surround to form an elliptical region. The elliptical region is used to accommodate physical keys or fingerprint recognition modules. In the example illustrated in FIG. 3F, the shaped screen can be a screen design having at least one small hole 46 in the upper half of the touch screen 130, and the space vacated by the small hole 46 is used to accommodate at least one front panel component of a camera, a distance sensor, a handset, and an ambient light sensor.

In addition, those skilled in the art can understand that the structure of the terminal 100 illustrated in the above figures does not constitute a limitation on the terminal 100. The terminal may include more or fewer components than illustrated in the drawings, or combine certain components, or different component arrangements. For example, the terminal 100 further includes components such as a radio frequency circuit, an input unit, a sensor, an audio circuit, a Wi-Fi module, a power supply, and a Bluetooth module, and details are not repeated herein.

In the related art, the terminal displays, in a menu presented according to a display instruction, preset icons, which is not flexible for icon display.

In view of the above, a method and a device for icon display, a terminal, and a storage medium are provided. According to the technical solutions of the implementations, when a display instruction is received, a switch icon and a shortcut function icon corresponding to a game application running in the foreground and an icon of a target application are acquired and displayed in the sidebar. Compared with the related art in which several preset function icons are fixedly displayed in the menu, in the implementations, when the game application is running in the foreground, the icon(s) corresponding to the game application can be displayed, which increases flexibility of icon display and better meets operation requirements.

In the implementations, various operations may be performed by the terminal. Furthermore, the terminal may be an electronic device installed with a game application, such as a mobile phone, a tablet computer, a multimedia playback device, a PC (personal computer), etc.

Figure 4:
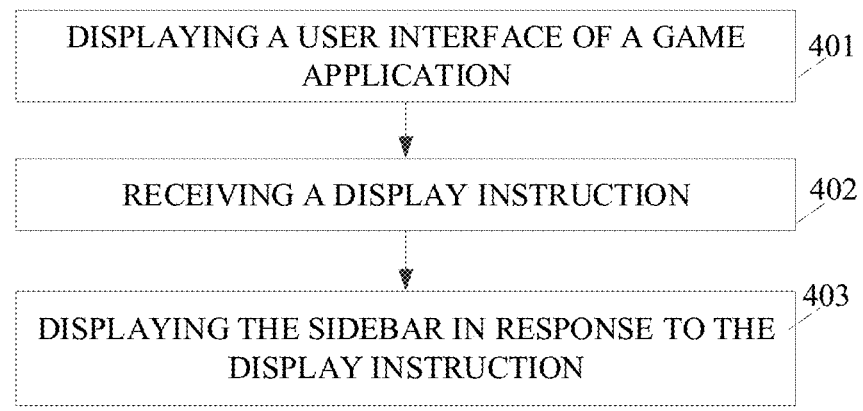
FIG. 4 is a flowchart illustrating a method for icon display according to implementations.

FIG. 4 is a flowchart illustrating a method for icon display according to implementations. The method begins at 401.

At block 401, a user interface of a game application is displayed.

In the implementation, the game application runs in the foreground of a terminal. During running of the game application in the foreground of the terminal, the terminal displays the user interface of the game application, which is a program interface of the game application. The terminal can display the user interface of the game application in full screen in a display screen or display the user interface of the game application in a part of a display region of the display screen, which is not limited herein.

At block 402, a display instruction is received.

The display instruction is triggered by a user, to request to display a sidebar. The following describes some implementation manners of receiving the display instruction by the terminal.

In one implementation manner, the block 402 is implemented as follows. The display instruction is received according to a first trigger signal corresponding to a dock (or called a floating window) displayed on the display screen, when the first trigger signal is received.

The dock can always be displayed above the user interface, can also be displayed above the user interface during launching and running of the application, and can also be displayed above the user interface according to an operation signal triggered by the user, which is not limited herein.

The dock can be round, oval, rectangular, etc., which it is not limited herein. The area of the dock can be set by the terminal by default or costumed by the user, which is not limited herein. In addition, in order to reduce occlusion of the dock to the user interface as much as possible, the transparency of the dock can be set to be greater than 0.

The display position of the dock (i.e., the position for displaying the dock) can be set by the terminal by default or costumed by the user, which is not limited herein. In addition, the display position of the dock can be changed. In an example, when the terminal receives a third trigger signal applied to the dock, the display position of the dock will be changed. The third trigger signal applied to the dock can be a single-click signal, a double-click signal, a long-press signal, a sliding signal, and a drag signal, which is not limited herein. For example, the third trigger signal applied to the dock is a drag signal, and the terminal treats the end position of the drag signal as the changed display position of the dock.

The dock can be hidden in the display screen. In an example, when the terminal receives a fourth trigger signal corresponding to the dock, the terminal hides the dock in response to the fourth trigger signal. The fourth trigger signal may be any one of a single-click signal, a double-click signal, a long-press signal, and a sliding signal. The fourth trigger signal is different from the first trigger signal and second trigger signal. For example, the terminal receives a sliding signal corresponding to the dock, and the sliding signal has a sliding direction from the display position of the dock to an edge region of the display screen.

The first trigger signal applied to the dock can be a single-click signal, a double-click signal, a long-press signal, a sliding signal, and a drag signal, which is not limited herein. In the implementation, for example, the first trigger signal applied to the dock is a click signal.

In another implementation manner, the block 402 is implemented as follows. The display instruction is received according to a second trigger signal corresponding to a side region in the display screen, when the second trigger signal is received.

The side region can be any side region in the display screen, which can be set by default by the terminal or customized by the user. The second trigger signal can be any one of a single-click signal, a double-click signal, a long-press signal, and a sliding signal. In the implementation, for example, the second trigger signal is a sliding signal is described.

Figure 5:
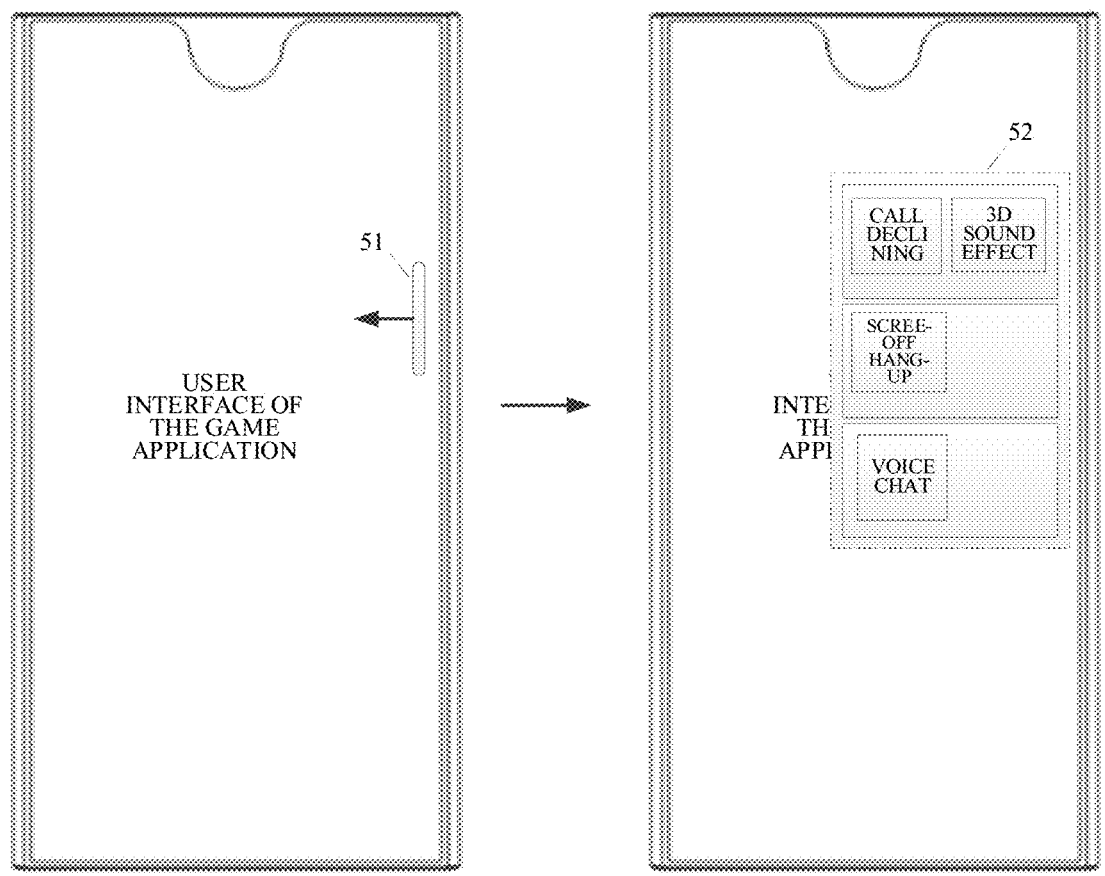
FIG. 5 is a schematic diagram illustrating an interface where a display instruction is received according to implementations.

In at least one implementation, when the terminal is in a portrait display state, if the first trigger signal corresponding to the dock displayed on the display screen is received, the display instruction is received according to the first trigger signal. FIG. 5 is a schematic diagram illustrating an interface where a display instruction is received according to implementations. When the terminal is in the portrait display state, if the terminal receives a sliding signal corresponding to the dock 51, the sidebar 52 is displayed.

Figure 6:
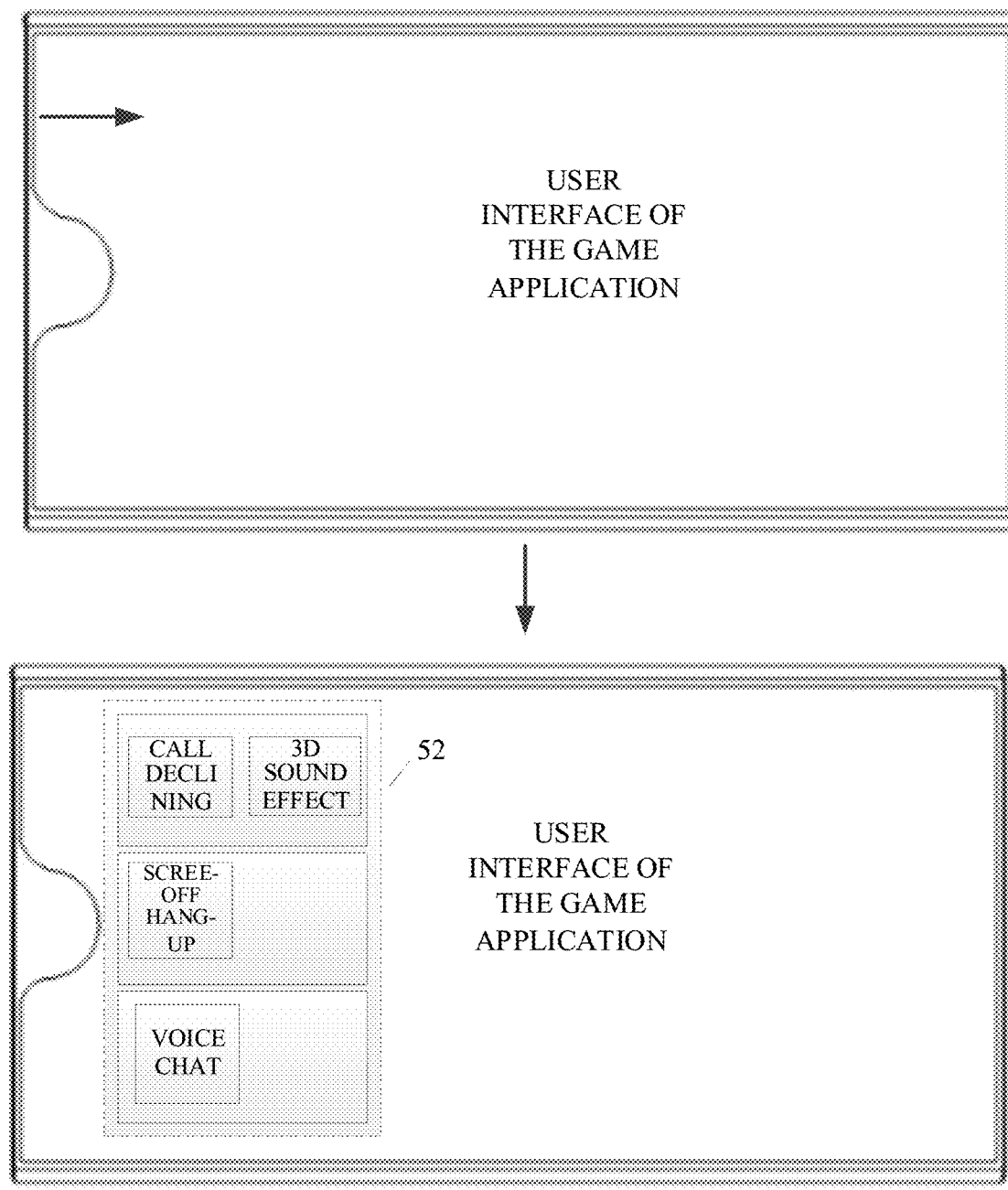
FIG. 6 is a schematic diagram illustrating an interface where a display instruction is received according to other implementations.

In at least one implementation, when the terminal is in a landscape display state, if the second trigger signal corresponding to the side region in the display screen is received, the display instruction is received according to the second trigger signal. FIG. 6 is a schematic diagram illustrating an interface where a display instruction is received according to other implementations. When the terminal is in the landscape display state, if the terminal receives a sliding signal corresponding to the side region, the sidebar 52 is displayed.

In other examples, if the display screen of the terminal defines a perforated region and the perforated region integrates one or more of: a pressure sensing component, a distance sensing component, and a light sensing component, the terminal may also receive a fifth trigger signal applied to the perforated region and receive the display instruction according to the fifth trigger signal.

At block 403, the sidebar is displayed in response to the display instruction.

The "sidebar" refers to a virtual region displayed close to the side of the terminal and is used for display icons. In the implementation, the sidebar includes three regions: a switch region, a shortcut function region, and a shortcut application region, where different regions are used to display different types of icons.

The area of the sidebar is generally smaller than that of the display screen of the terminal. Furthermore, the sidebar can be rectangular, fan-shaped, circular, etc., which is not limited herein. The display position of the sidebar can be determined according to a position where the display instruction is received. In an example, when receiving the display instruction according to the first trigger signal applied to the dock, the terminal displays the sidebar on the periphery of the dock.

The switch region is used to display a switch icon corresponding to the game application. The switch icon corresponding to the game application is used to trigger a function switch corresponding to the switch icon to switch between an on-state and an off-state.

In an example, the switch icon corresponding to the game application is a switch icon whose trigger frequency meets a first preset condition during running of the game application. The trigger frequency refers to the frequency and/or number of times the switch icon is triggered. The first preset condition may be that: the trigger frequency is greater than a preset number of times or the trigger frequency ranks in the top n. The preset number of times can be set according to actual needs, and n can be determined according to the display position of the switch region.

In an example, the switch icon corresponding to the game application includes one or more of: a navigation lock switch, a call declining switch, and a 3D (three-dimensional) sound effect switch.

The navigation lock switch is used to trigger a navigation lock function to switch between an on-state and an off-state. When the navigation lock switch is turned on, a navigation key is in a locked state, that is, the navigation key cannot respond to touch operations of the user. When the navigation lock switch is turned off, the navigation key is in an unlocked state, that is, the navigation key can respond to touch operations of the user. The call declining switch is used to trigger a call declining function to switch between an on-state and an off-state. When the call declining switch is turned on, if other devices send a call request to the terminal, the terminal will actively decline the call request. When the call declining switch is turned off, if other devices send a call request to the terminal, the terminal will display a call request interface. The 3D sound effect switch is used to trigger a 3D sound effect function to switch between an on-state and an off-state. When the 3D sound effect switch is turned on, the terminal enables the 3D sound effect. When the 3D sound effect switch is turned off, the terminal disables the 3D sound effect.

The area of the switch region can be set according to the area of the sidebar, which is not limited herein. Due to the limited area of the switch region, the switch region can accommodate a limited number of switch icons. When the number of switch icons to be displayed is greater than the number of switch icons that the switch region can accommodate, the terminal displays a part of the switch icons in the switch region. When an operation signal applied to the switch region is received, the displayed switch icons will not be displayed any more, and other switch icons except those already displayed will be displayed. In an example, the above operation signal is a sliding signal applied to the switch region.

In addition, the position of each switch icon displayed in the switch region can be set by default by the terminal or customized by the user, which is not limited herein. In an example, the position of each switch icon displayed in the switch region is customized by the user. In this case, the terminal receives a long-press operation acting on any switch icon, and then the switch region becomes editable, such that each switch icon can be dragged by the user to change the position of each switch icon in the switch region.

The shortcut function region is used to display a shortcut function icon corresponding to the game application. The shortcut function icon corresponding to the game application is used to trigger the terminal to execute a shortcut function corresponding to the shortcut function icon.

In an example, the shortcut function icon corresponding to the game application is a shortcut function icon whose use frequency meets a second preset condition during running of the game application. The use frequency refers to the frequency and/or number of times the shortcut function corresponding to the shortcut function icon is executed. The second preset condition may be that: the use frequency is greater than a preset number of times or the use frequency ranks in the top m. The preset number of times can be set according to actual needs, and m can be determined according to the display position of the shortcut function region.

In an example, the shortcut function icon corresponding to the game application includes one or more of: a screenshot icon, a screen recording icon, a mute icon, a background cleaning icon, a screen-off hang-up icon.

The screenshot icon is used to trigger capturing of all or part of the display region of the display screen. The screen recording icon is used to trigger recording of all or part of the display region of the display screen. The mute icon is used to trigger to turn on or off of the sound effect of the game application. The background cleaning icon is used to trigger closing of the application running in the background, to improve running effect of the game application. The screen-off hang-up icon is used to trigger to perform a screen-off hang-up function. The screen-off hang-up function allows performing a hang-up operation while the terminal is in a screen-on state.

The area of the shortcut function region can be set according to the area of the sidebar, which is not limited herein. Due to the limited area of the shortcut function region, the shortcut function region can accommodate a limited number of shortcut function icons. When the number of shortcut function icons to be displayed is greater than the number of shortcut function icons that the shortcut function region can accommodate, the terminal displays a part of the shortcut function icons in the shortcut function region. When an operation signal applied to the shortcut function region is received, the displayed shortcut function icons will not be displayed any more, and other shortcut function icons except those already displayed will be displayed. In an example, the above operation signal is a sliding signal applied to the shortcut function region.

In addition, the position of each shortcut function icon displayed in the shortcut function region can be set by default by the terminal or customized by the user, which is not limited herein. In an example, the position of each shortcut function icon displayed in the shortcut function region is customized by the user. In this case, the terminal receives a long-press operation acting on any shortcut function icon, and then the shortcut function region becomes editable, such that each shortcut function icon can be dragged by the user to change the position of each shortcut function icon in the shortcut function region.

The shortcut application region is used to display an icon of a target application. The icon of the target application is a preset application icon or an application icon corresponding to the game application. The preset application icon may be set by the user or set by default by the terminal, which is not limited herein. The application icon corresponding to the game application is an icon of an application whose frequency and/or times of running simultaneously with the game application meet a third preset condition. The third preset condition may be that the frequency and/or times of running simultaneously with the game application is greater than a preset value, or the frequency and/or times of running simultaneously with the game application rank in the top p. The preset value can be set according to actual needs, and p can be actually determined according to the display position of the shortcut application region.

The area of the shortcut application region can be set according to the area of the sidebar, which is not limited herein. Due to the limited area of the shortcut application region, the shortcut application region can accommodate a limited number of shortcut application icons. When the number of shortcut application icons to be displayed is greater than the number of shortcut application icons that the shortcut application region can accommodate, the terminal displays a part of the shortcut application icons in the shortcut application region. When an operation signal applied to the shortcut application region is received, the displayed shortcut application icons will not be displayed any more, and other shortcut application icons except those already displayed will be displayed. In an example, the above operation signal is a sliding signal applied to the shortcut application region.

In addition, the position of each shortcut application icon displayed in the shortcut application region can be set by default by the terminal or customized by the user, which is not limited herein. In an example, the position of each shortcut application icon displayed in the shortcut application region is customized by the user. In this case, the terminal receives a long-press operation acting on any shortcut application icon, and then the shortcut application region becomes editable, such that each shortcut application icon can be dragged by the user to change the position of each shortcut application icon in the shortcut application region.

Figure 7:
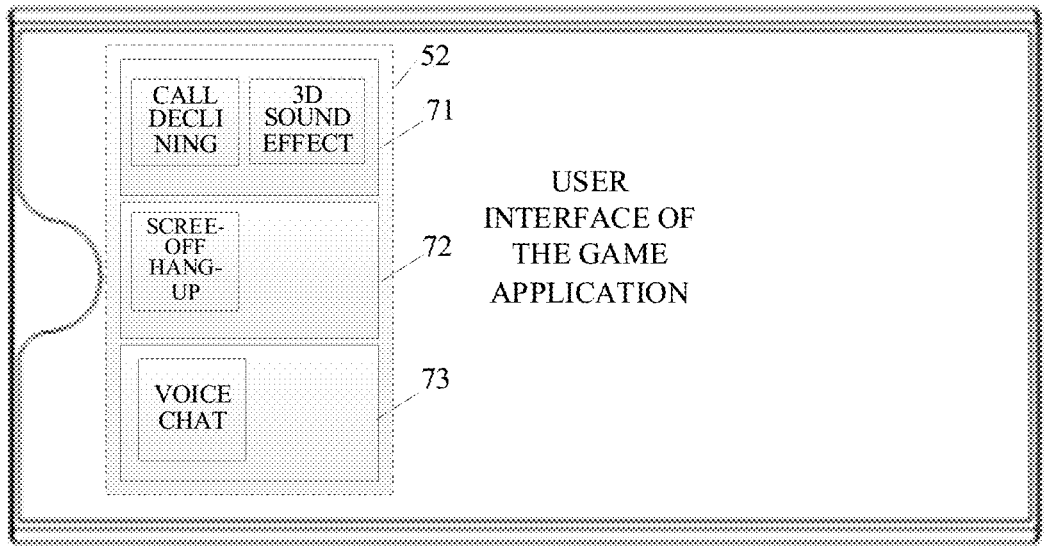
FIG. 7 is a schematic diagram illustrating an interface where a sidebar is displayed according to implementations.

FIG. 7 is a schematic diagram illustrating an interface where a sidebar 52 is displayed according to implementations. As illustrated in FIG. 7, the sidebar 52 includes a switch region 71, a shortcut function region 72, and a shortcut application region 73. The terminal displays in the switch region 71 a 3D sound effect switch and a call declining switch, displays in the shortcut function region 72 a screen-off hang-up icon, and displays in the shortcut application region 73 a voice chat application icon.

According to the technical solutions of the implementations, when the display instruction is received, the switch icon and the shortcut function icon corresponding to the game application running in the foreground and the icon of the target application are acquired and displayed in the sidebar. Compared with the related art in which several preset function icons are fixedly displayed in the menu, in the implementations, when the game application is running in the foreground, the icon(s) corresponding to the game application can be displayed, which increases flexibility of icon display and better meets operation requirements.

After the terminal displays in the sidebar the shortcut function icon corresponding to the game application, the user can easily trigger the terminal to execute the shortcut function corresponding to the shortcut function icon, to improve man-machine interaction efficiency. The following will describe an example where the shortcut function icon corresponding to the game application is a screen-off hang-up icon.

Figure 8:
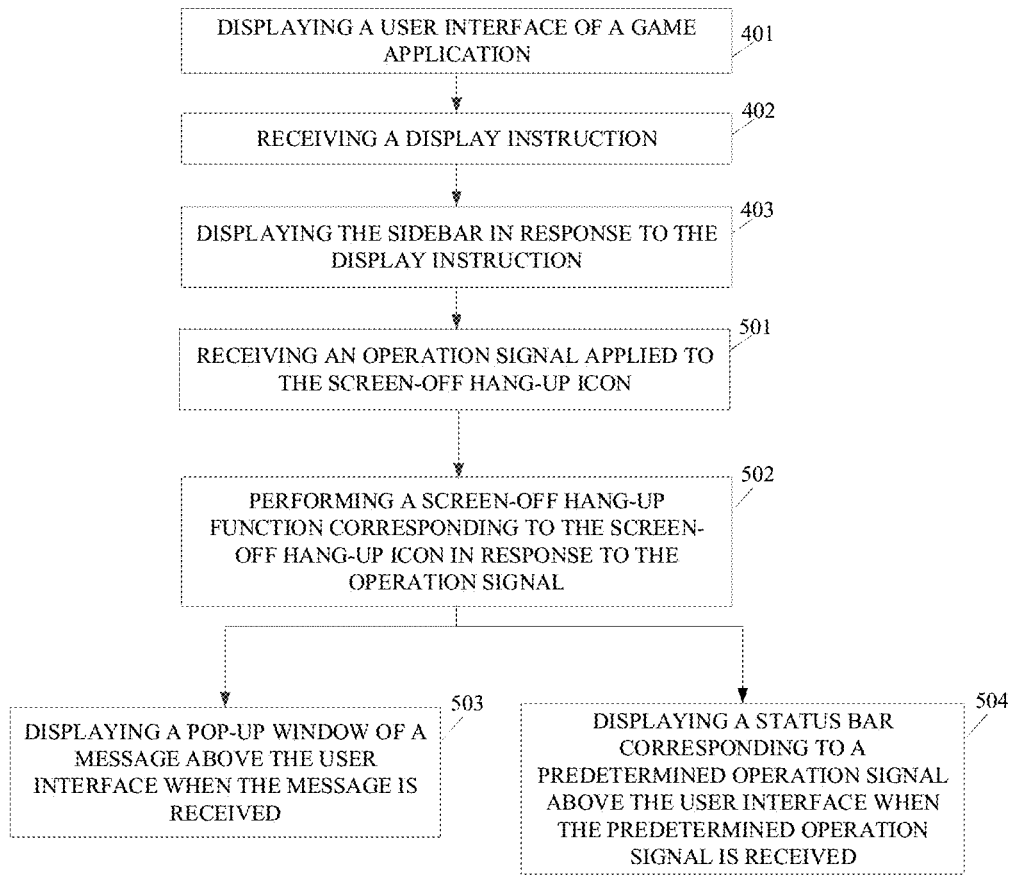
FIG. 8 is a flowchart illustrating a method for icon display according to other implementations.

FIG. 8 is a flowchart illustrating a method for icon display according to other implementations. In at least one implementation, the following is further conducted.

At block 501, an operation signal applied to the screen-off hang-up icon is received.

The operation signal may be any one of a single-click signal, a double-click signal, a long-press signal, a drag signal, and a sliding signal. In the implementation, for example, the operation signal is a single-click signal.

At block 502, a screen-off hang-up function corresponding to the screen-off hang-up icon is performed in response to the operation signal.

The screen-off hang-up function allows performing a hang-up operation while the terminal is in a screen-on state. The hang-up operation refers to simulating operations of the user in the game application by the terminal or a process or an application in the terminal, which involves no user participation. When the screen-off hang-up function is enabled, the terminal remains in the screen-on state while performing the hang-up operation, to avoid unexpected exit of the game application after the terminal is switched to an off-screen state.

In at least one implementation, after block 502, the following is further conducted. A touch signal is received. The touch signal is not responded when the touch signal is not a target touch signal. The target touch signal is used to trigger to stop performing the screen-off hang-up function. That is, when the screen-off hang-up function is enabled, the terminal is still in a locked state. In this case, the terminal only responds to a touch signal used to release the locked state and does not respond to other touch operations, which can prevent termination of the screen-off hang-up function due to an unintended touch. In at least one implementation, during execution of the screen-off hang-up function, the terminal decreases transparency and/or brightness of the user interface of the game application. After the screen-off hang-up function is enabled, the terminal always displays the user interface of the game application, but the user is less likely to operate on the user interface. In this case, the terminal decreases the brightness and/or transparency of the user interface of the game application, to save power consumption of the terminal.

If the user desires to execute the screen-off hang-up function, the screen-off hang-up icon can be triggered, and the terminal performs the screen-off hang-up function according to a received operation signal corresponding to the screen-off hang-up icon. After the terminal enables the screen-off hang-up function, the terminal displays a first reminder message, which is used to remind that the screen-off hang-up function is enabled. In an example, the first reminder message is further used to remind how to quickly disable the screen-off hang-up function.

Figure 9:
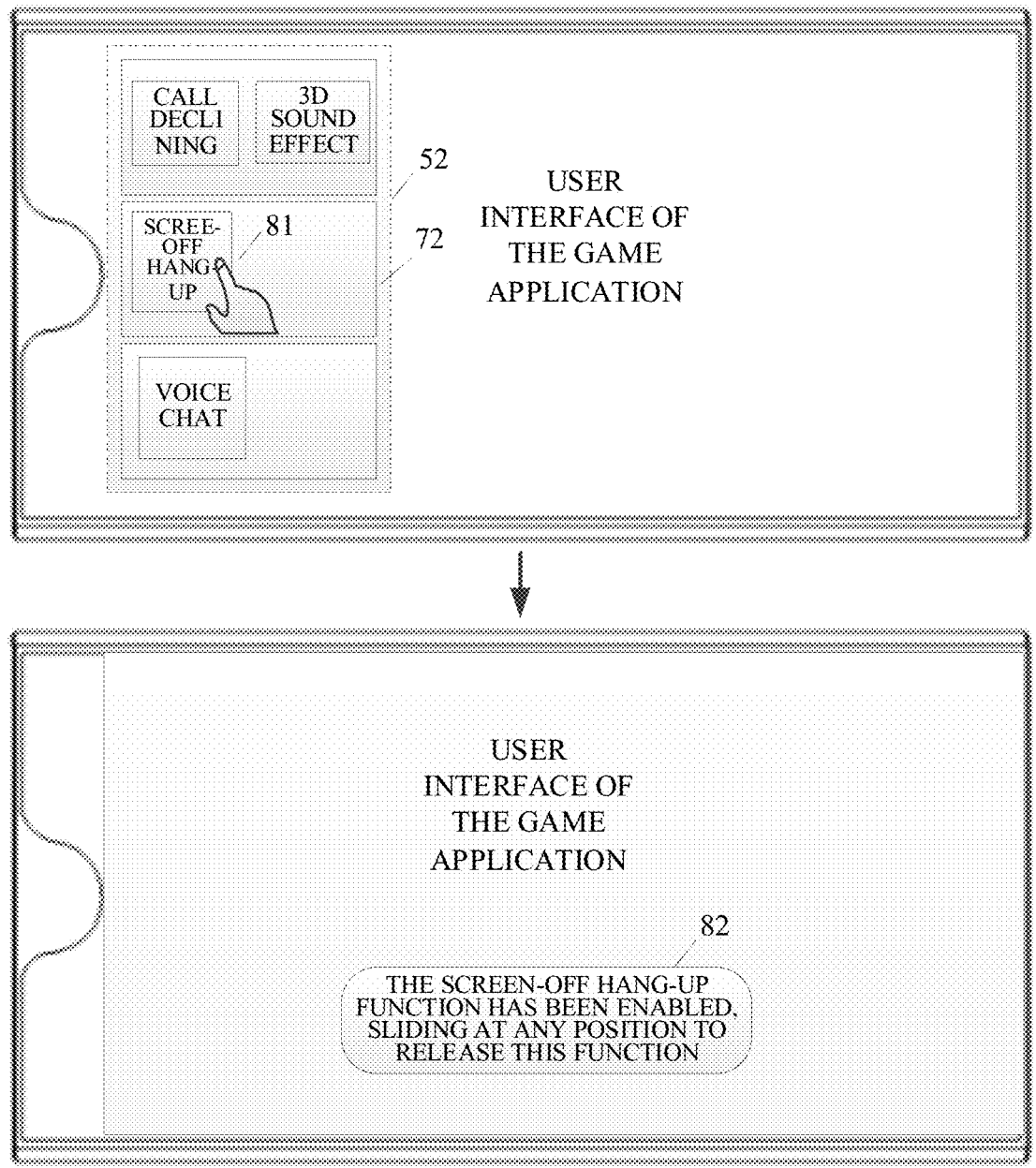
FIG. 9 is a schematic diagram illustrating an interface where a screen-off hang-up icon is triggered according to implementations.

FIG. 9 is a schematic diagram illustrating an interface where a screen-off hang-up icon is triggered and a reminder message is displayed according to implementations. As illustrated in FIG. 9, the shortcut function region 72 in the sidebar 52 includes a screen-off hang-up icon 81. When the screen-off hang-up icon 81 is clicked by the user, the terminal displays a reminder message 82: "the screen-off hang-up function has been enabled, sliding at any position to release this function".

When the terminal performs the screen-off hang-up function, the terminal always displays the user interface of the game application. In this case, the terminal may receive messages from other applications. In at least one implementation, after block 502, the following is further conducted.

At block 503, a pop-up window of a message is displayed above the user interface when the message is received.

The message includes any one of: a notification message, an incoming call message, a short message, a voice call message, and a video call message. The pop-up window is used to display information of the message. If the message is a voice call message, the nickname, avatar, and receiving button of a requesting party are displayed in the pop-up window.

Figure 10:
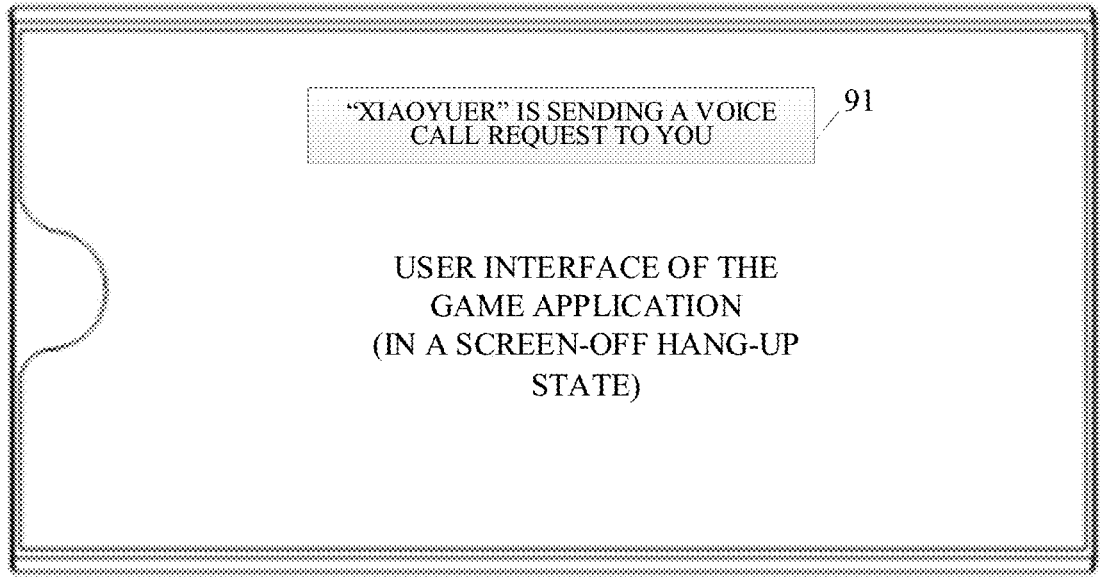
FIG. 10 is a schematic diagram illustrating an interface of a pop-up window according to implementations.

FIG. 10 is a schematic diagram illustrating an interface of a pop-up window according to implementations. As illustrated in FIG. 10, when the screen-off hang-up function is triggered, that is, when the terminal enables the screen-off hang-up function, if the terminal receives a call request message, the terminal will display a pop-up window 91, where the pop-up window 91 includes information of the call request message: "xiaoyuer is sending a voice call request to you".

In one implementation manner, if the terminal receives a first operation signal corresponding to the pop-up window, a floating window is displayed above the user interface. The floating window is used to display a message interface of the message. In the above manner, when the terminal receives the message, the pop-up window of the message will be displayed. It is possible to process the received message while using the game application, which improves efficiency of using the terminal.

In another implementation manner, if the terminal receives the first operation signal corresponding to the pop-up window, the terminal jumps to display the message interface of the message. The first operation signal may be any one of a single-click signal, a double-click signal, a long-press signal, a sliding signal, and a drag signal. In the implementation, for example, the first operation signal is a click signal.

In an example, if the terminal receives a second operation signal corresponding to the pop-up window, the terminal will not display the pop-up window. In an example, the second operation signal is a sliding signal sliding from the central region of the pop-up window to the outside of the pop-up window. When the user does not want to process the message, the user can slide the pop-up window. When the terminal receives the second operation signal corresponding to the pop-up window, the pop-up window will not be displayed.

When the terminal performs the screen-off hang-up function, the terminal always displays the user interface of the game application. In this case, the terminal may adjust volume and brightness of the game application. In at least one implementation, after block 502, the following is further conducted.

At block 504, a status bar corresponding to a predetermined operation signal is displayed above the user interface when the predetermined operation signal is received.

The predetermined operation signal includes any one of: an operation signal for brightness adjustment and an operation signal for volume adjustment. When the terminal receives the operation signal for brightness adjustment, a brightness status bar is displayed above the user interface, where the brightness status bar includes a brightness progress bar corresponding to the current user interface. When the terminal receives the operation signal for volume adjustment, a volume status bar is displayed above the user interface, where the volume status bar includes a volume progress bar.

Figure 11:
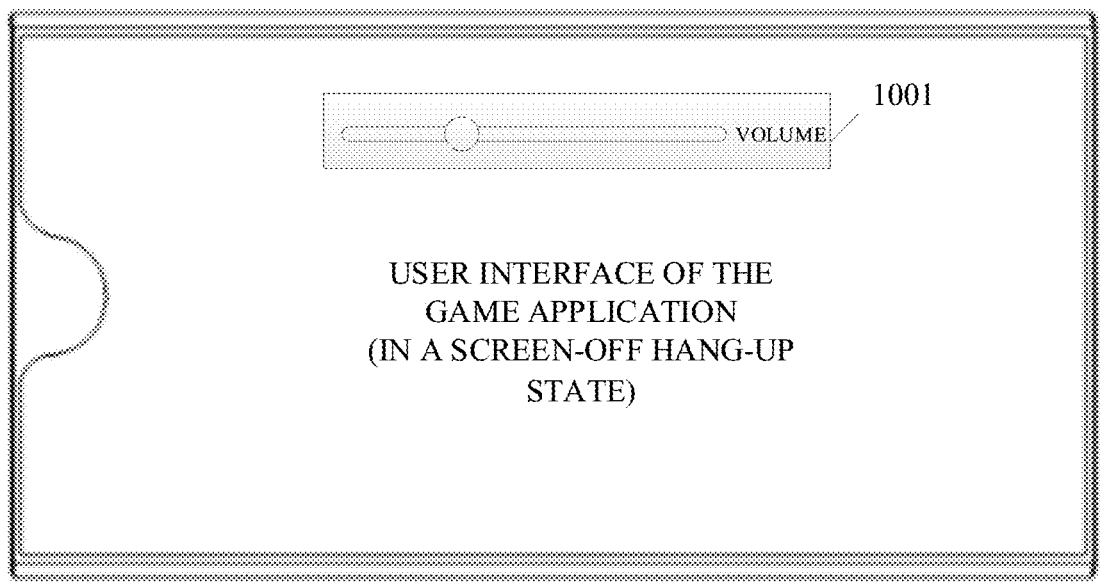
FIG. 11 is a schematic diagram illustrating an interface of a status bar according to implementations.

FIG. 11 is a schematic diagram illustrating an interface of a status bar according to implementations. As illustrated in FIG. 11, when the screen-off hang-up function is triggered, that is, when the terminal enables the screen-off hang-up function, if the terminal receives the operation signal for volume adjustment, the terminal displays a volume status bar 1001 above the user interface, where the volume status bar 1001 includes a volume progress bar.

According to the technical solutions of the implementation, after the screen-off hang-up icon displayed in the sidebar is triggered, the screen-off hang-up function is enabled. As such, unexpected exit of the game application is less likely to occur even when the user interface has not been operated by the user for a long time.

After the terminal displays in the sidebar the switch icon corresponding to the game application, the user can conveniently trigger the function switch corresponding to the switch icon to be switched between the on-state and the off-state, so as to improve human-machine interaction efficiency. In the following, for example, the switch icon is the navigation lock switch.

Figure 12:
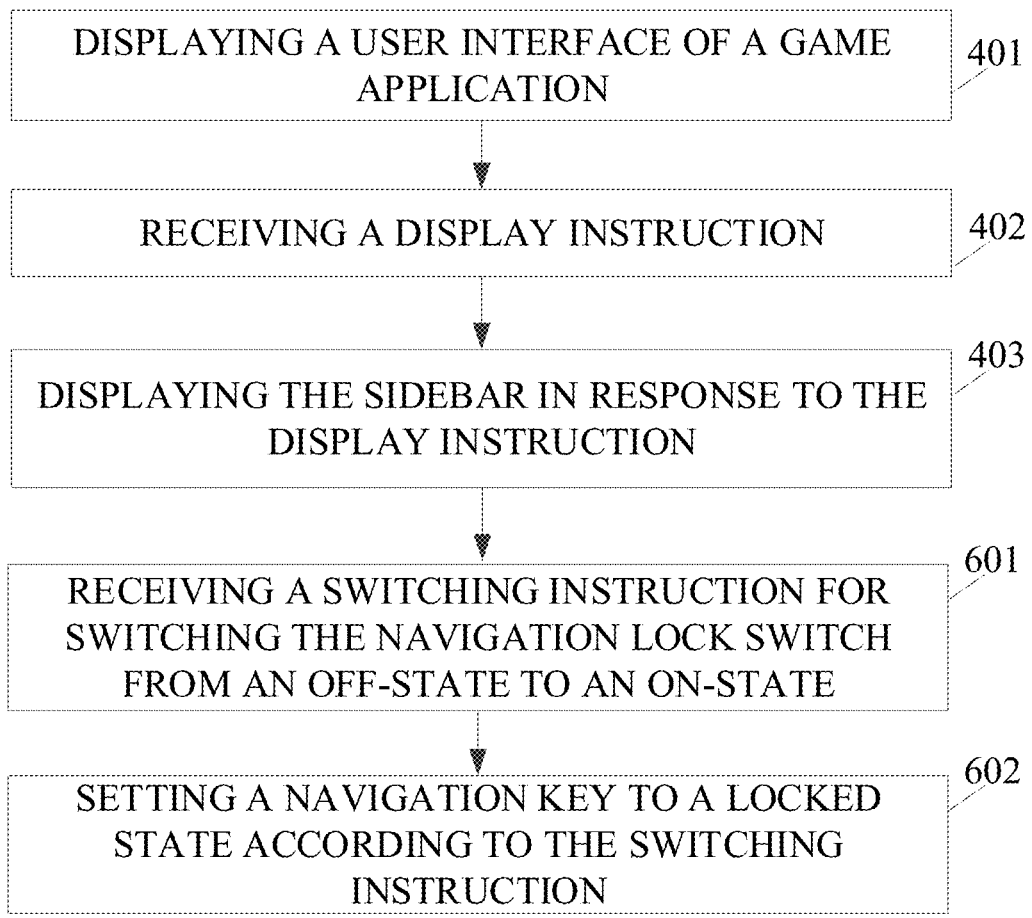
FIG. 12 is a flowchart illustrating a method for icon display according to other implementations.

FIG. 12 is a flowchart illustrating a method for icon display according to other implementations. In at least one implementation, the following is further conducted.

At block 601, a switching instruction for switching the navigation lock switch from an off-state to an on-state is received.

The switching instruction is triggered by the user and is used to switch the navigation lock switch from the off-state to the on-state. The switching instruction can be any one of a single-click signal, a double-click signal, a long-press signal, a sliding signal, and a drag signal applied to the navigation lock switch. In the implementation, for example, the switching instruction is a click signal applied to the navigation lock switch.

At block 602, a navigation key is set to a locked state according to the switching instruction.

The navigation key refers to a function key disposed under the display screen, which generally includes a menu key, a return key, and a home key. The menu key is used to trigger the display of a function menu, the return key is used to trigger the return to a previous interface, and the home key is used to trigger the return to a desktop interface. The navigation key in the locked state responds to no touch operation. For example, when the menu key is touched by the user, the terminal can receive the touch operation signal applied to the menu key but the terminal will not display the function menu.

When the terminal sets the navigation key to the locked state, the terminal displays a second reminder information, which is used to remind that the navigation key is locked. In an example, the second reminder information is further used to remind how to quickly unlock the navigation key.

Figure 13:
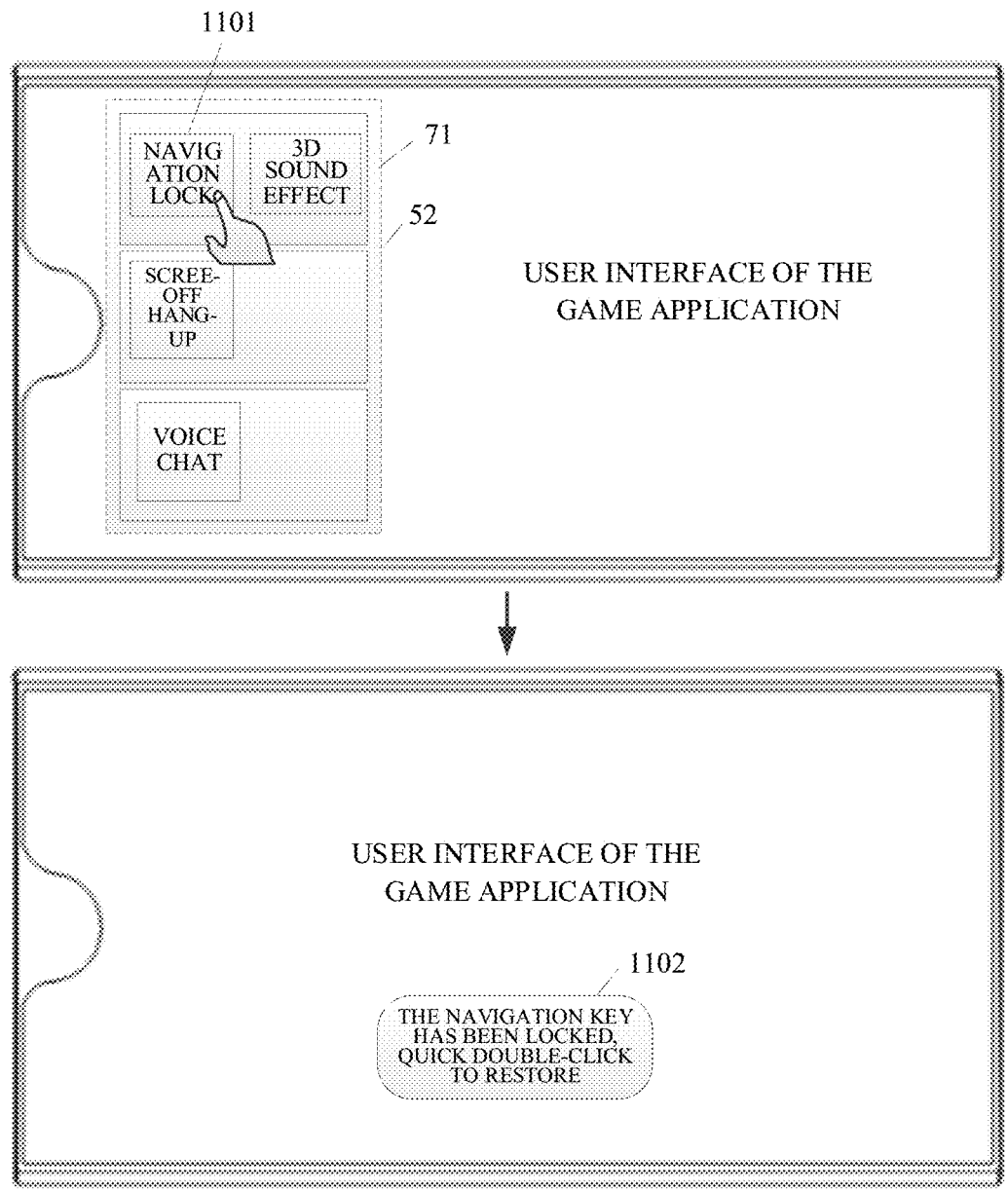
FIG. 13 is a schematic diagram illustrating an interface where a navigation lock switch is triggered according to implementations.

FIG. 13 is a schematic diagram illustrating an interface where a navigation lock switch is triggered and a second reminder message is displayed according to implementations. As illustrated in FIG. 13, the terminal displays in the switch region 71 in the sidebar 52 a navigation lock switch 1101. After the navigation lock switch 1101 is clicked by the user, the terminal displays a second reminder message 1102 "the navigation key has been locked, quick double-click to restore".

According to the technical solutions of the implementations, during running of the game application, the navigation lock switch is switched to the on-state according to the switching instruction, so that the navigation key is locked, to avoid exit of the game application due to unintended touch on the navigation key.

The following are device implementations of this application, which can be used to implement method implementations of this application. For details not disclosed in the device implementations of this application, reference can be made to the method implementations of this application.

Figure 14:
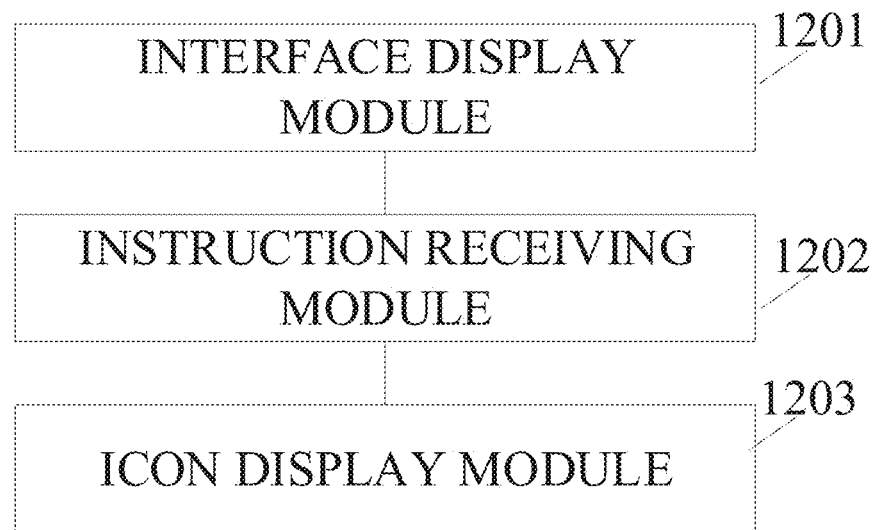
FIG. 14 is a block diagram illustrating a device for icon display according to implementations.

FIG. 14 is a block diagram illustrating a device for icon display according to implementations. The device has a function of realizing the above method implementations, and the function can be implemented by hardware, or by hardware executing corresponding software. The device includes an interface display module 1201, an instruction receiving module 1202, and an icon display module 1203.

The interface display module 1201 is configured to display a user interface of a game application.

The instruction receiving module 1202 is configured to receive a display instruction, where the display instruction is used to request to display a sidebar.

The icon display module 1203 is configured to display the sidebar in response to the display instruction. The sidebar includes a switch region, a shortcut function region, and a shortcut application region, where the switch region is used to display a switch icon corresponding to the game application, the shortcut function region is used to display a shortcut function icon corresponding to the game application, and the shortcut application region is used to display an icon of a target application.

According to the technical solutions of the implementations, when the display instruction is received, the switch icon and the shortcut function icon corresponding to the game application running in the foreground and the icon of the target application are acquired and displayed in the sidebar. Compared with the related art in which several preset function icons are fixedly displayed in the menu, in the implementations, when the game application is running in the foreground, the icon(s) corresponding to the game application can be displayed, which increases flexibility of icon display and better meets operation requirements.

Based on the implementation illustrated in FIG. 14, in at least one implementation, the shortcut function icon corresponding to the game application includes a screen-off hang-up icon and the device further includes a signal receiving module and a function performing module (not illustrated in the figure).

The signal receiving module is configured to receive an operation signal applied to the screen-off hang-up icon.

The function performing module is configured to perform, in response to the operation signal, a screen-off hang-up function corresponding to the screen-off hang-up icon, where the screen-off hang-up function allows performing a hang-up operation while a terminal is in a screen-on state.

In at least one implementation, the device further includes a pop-up window display module (not illustrated in the figure).

The pop-up window display module is configured to display a pop-up window of a message above the user interface when the message is received, where the message includes any one of: a notification message, an incoming call message, a short message, a voice call message, and a video call message.

In at least one implementation, the device further includes a status bar display module (not illustrated in the figure).

The status bar display module is configured to display a status bar corresponding to a predetermined operation signal above the user interface when the predetermined operation signal is received, where the predetermined operation signal includes any one of: an operation signal for brightness adjustment and an operation signal for volume adjustment.

In at least one implementation, the device further includes a transparency adjusting module (not illustrated in the figure).

The transparency adjusting module is configured to decrease at least one of transparency or brightness of the user interface of the game application.

In at least one implementation, the signal receiving module is configured to receive a touch signal; the function performing module is configured to dismiss or ignore the touch signal when the touch signal is not a target touch signal, where the target touch signal is used to trigger to stop performing the screen-off hang-up function.

Based on the implementation illustrated in FIG. 14, in at least one implementation, the switch icon corresponding to the game application includes a navigation lock switch (or icon) and the device further includes a first receiving module and a state setting module (not illustrated in the figure).

The first receiving module is configured to receive a switching instruction for switching the navigation lock switch from an off-state to an on-state.

The state setting module is configured to set a navigation key to a locked state according to the switching instruction, where the navigation key in the locked state responds to no touch operation.

Based on the implementation illustrated in FIG. 14, in at least one implementation, the instruction receiving module 1202 is configured to: receive the display instruction according to a first trigger signal corresponding to a dock displayed on a display screen, when the first trigger signal is received; or receive the display instruction according to a second trigger signal corresponding to a side region in the display screen, when the second trigger signal is received.

In at least one implementation, the instruction receiving module 1202 is configured to: receive the display instruction according to the first trigger signal when a terminal is in a portrait display state; or receive the display instruction according to the second trigger signal when the terminal is in a landscape display state.

Figure 15:
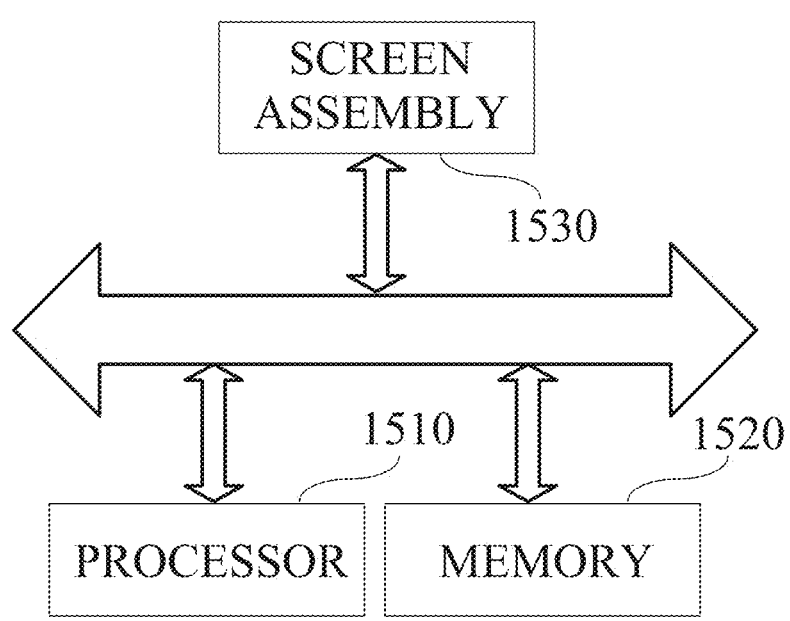
FIG. 15 is a block diagram illustrating a terminal according to implementations.

FIG. 15 is a block diagram illustrating a terminal according to implementations. As illustrated in FIG. 15, the terminal includes a processor 1510 and a non-transitory computer readable storage (such as a memory 1520). The memory 1520 is configured to store at least one instruction. The at least one instruction is loaded and executed by the processor 1510 to implement the method for icon display of any of the above implementations. In an example, the terminal further includes a screen assembly 1530, where the screen assembly 1530 is used to display the user interface of the game application and the sidebar.

It should be noted that, for the functions of the device of the foregoing implementations, the division of the foregoing functional modules is merely used for illustration. In practice, the above-mentioned functions can be allocated to different functional modules as required, that is, the internal structure of the device can be divided into different functional modules to complete all or part of the functions described above. In addition, the device implementations and the method implementations of the above belong to the same concept, and the implementation process of the device implementations is detailed in the method implementations, which will not be repeated herein.

In at least one implementation, a computer-readable storage medium is provided. The computer-readable storage medium is configured to store computer programs. When loaded and executed by a processor of a terminal, the computer programs are configured to implement operations of the above method implementations.

In at least one example, a computer program product is also provided. When executed, the computer program product is configured to implement functions of operations of the above method implementations.

It should be understood that, the "plurality" mentioned herein refers to two or more. "And/or" describes the relationship between associated objects, indicating that there can be three relationships. For example, "A and/or B" means: "A" exists alone, "A" and "B" exist at the same time, and "B" exists alone. The character "/" generally indicates that the relationship between associated objects is "or".

The above serial numbers of the implementations are only for description and do not represent advantages and disadvantages of the implementations.

The above is some implementations of this application and is not intended to limit this application. Any modification, equivalent substitute, improvement, etc., made within the spirit and principle of this application shall be included in the protection scope of this application.

What is claimed is:

1. A method for icon display, comprising:
displaying a user interface of a game application;
receiving a display instruction, wherein the display instruction is used to request to display a sidebar; and
displaying the sidebar in response to the display instruction, wherein the sidebar comprises a switch region, a shortcut function region, and a shortcut application region, wherein the switch region is used to display a switch icon corresponding to the game application, the shortcut function region is used to display a shortcut function icon corresponding to the game application, and the shortcut application region is used to display an icon of a target application, wherein:
the switch icon displayed in the switch region is a switch icon whose trigger frequency meets a first preset condition during running of the game application;
the shortcut function icon displayed in the shortcut function region is a shortcut function icon whose use frequency meets a second preset condition during running of the game application; and the icon of the target application displayed in the shortcut application region is an icon of an application whose frequency of running simultaneously with the game application meets a third preset condition;

wherein the shortcut function icon corresponding to the game application comprises a screen-off hang-up icon and the method further comprises:

after displaying the sidebar in response to the display instruction, receiving an operation signal applied to the screen-off hang-up icon; and performing, in response to the operation signal, a screen-off hang-up function corresponding to the screen-off hang-up icon, wherein the screen-off hang-up function allows performing a hang-up operation while a terminal is in a screen-on state; wherein when the screen-off hang-up function is enabled, the terminal is in a locked state, and the terminal only responds to a touch signal used to release the locked state; and wherein during execution of the screen-off hang-up function, transparency and/or brightness of the user interface of the game application is decreased by the terminal.

2. The method of claim 1, further comprising:

after performing, in response to the operation signal, the screen-off hang-up function corresponding to the screen-off hang-up icon, displaying a pop-up window of a message above the user interface when the message is received, wherein the message comprises any one of: a notification message, an incoming call message, a short message, a voice call message, and a video call message.

3. The method of claim 1, further comprising:

after performing, in response to the operation signal, the screen-off hang-up function corresponding to the screen-off hang-up icon, displaying a status bar corresponding to a predetermined operation signal above the user interface when the predetermined operation signal is received, wherein the predetermined operation signal comprises any one of: an operation signal for brightness adjustment and an operation signal for volume adjustment.

4. The method of claim 1, further comprising:

after performing, in response to the operation signal, the screen-off hang-up function corresponding to the screen-off hang-up icon, receiving a touch signal; and dismissing the touch signal when the touch signal is not a target touch signal, wherein the target touch signal is used to trigger to stop performing the screen-off hang-up function.

5. The method of claim 1, wherein receiving the display instruction comprises:

receiving the display instruction according to a first trigger signal corresponding to a dock displayed on a display screen, when the first trigger signal is received; or receiving the display instruction according to a second trigger signal corresponding to a side region in the display screen, when the second trigger signal is received.

6. The method of claim 5, wherein:

receiving the display instruction according to the first trigger signal comprises:

receiving the display instruction according to the first trigger signal when a terminal is in a portrait display state; or receiving the display instruction according to the second trigger signal comprises:

receiving the display instruction according to the second trigger signal when the terminal is in a landscape display state.

7. A terminal, comprising:

at least one processor; and a non-transitory computer readable storage, coupled to the at least one processor and storing at least one computer executable instruction thereon which, when executed by the at least one processor, causes the at least one processor to:

display a user interface of a game application;

receive a display instruction, wherein the display instruction is used to request to display a sidebar; and display the sidebar in response to the display instruction, wherein the sidebar comprises a switch region, a shortcut function region, and a shortcut application region, wherein the switch region is used to display a switch icon corresponding to the game application, the shortcut function region is used to display a shortcut function icon corresponding to the game application, and the shortcut application region is used to display an icon of a target application, wherein:

the switch icon displayed in the switch region is a switch icon whose trigger frequency meets a first preset condition during running of the game application;

the shortcut function icon displayed in the shortcut function region is a shortcut function icon whose use frequency meets a second preset condition during running of the game application; and the icon of the target application displayed in the shortcut application region is an icon of an application whose frequency of running simultaneously with the game application meets a third preset conditions;

wherein the shortcut function icon corresponding to the game application comprises a screen-off hang-up icon and the at least one processor is further configured to:

receive an operation signal applied to the screen-off hang-up icon; and perform, in response to the operation signal, a screen-off hang-up function corresponding to the screen-off hang-up icon, wherein the screen-off hang-up function allows performing a hang-up operation while a terminal is in a screen-on state; wherein when the screen-off hang-up function is enabled, the terminal is in a locked state, and the terminal only responds to a touch signal used to release the locked state; and wherein during execution of the screen-off hang-up function, transparency and/or brightness of the user interface of the game application is decreased by the terminal.

8. The terminal of claim 7, wherein the at least one processor is further configured to:

display a pop-up window of a message above the user interface when the message is received, wherein the message comprises any one of: a notification message, an incoming call message, a short message, a voice call message, and a video call message.

9. The terminal of claim 7, wherein the at least one processor is further configured to:

display a status bar corresponding to a predetermined operation signal above the user interface when the predetermined operation signal is received, wherein the predetermined operation signal comprises any one of: an operation signal for brightness adjustment and an operation signal for volume adjustment.

10. The terminal of claim 7, wherein the at least one processor is further configured to:
   receive a touch signal; and
   dismiss the touch signal when the touch signal is not a target touch signal, wherein the target touch signal is used to trigger to stop performing the screen-off hang-up function.

11. The terminal of claim 7, wherein the at least one processor configured to receive the display instruction is configured to:
   receive the display instruction according to a first trigger signal corresponding to a dock displayed on a display screen, when the first trigger signal is received; or
   receive the display instruction according to a second trigger signal corresponding to a side region in the display screen, when the second trigger signal is received.

12. The terminal of claim 11, wherein:
   the at least one processor configured to receive the display instruction according to the first trigger signal is configured to:
      receive the display instruction according to the first trigger signal when a terminal is in a portrait display state; or
   the at least one processor configured to receive the display instruction according to the second trigger signal is configured to:
      receive the display instruction according to the second trigger signal when the terminal is in a landscape display state.

13. A non-transitory computer readable storage medium storing a computer program which, when executed by a processor, causes the processor to:
   display a user interface of a game application;
   receive a display instruction, wherein the display instruction is used to request to display a sidebar; and
   display the sidebar in response to the display instruction, wherein the sidebar comprises a switch region, a shortcut function region, and a shortcut application region, wherein the switch region is used to display a switch icon corresponding to the game application, the shortcut function region is used to display a shortcut function icon corresponding to the game application, and the shortcut application region is used to display an icon of a target application, wherein:
      the switch icon displayed in the switch region is a switch icon whose trigger frequency meets a first preset condition during running of the game application;
      the shortcut function icon displayed in the shortcut function region is a shortcut function icon whose use frequency meets a second preset condition during running of the game application; and
      the icon of the target application displayed in the shortcut application region is an icon of an application whose frequency of running simultaneously with the game application meets a third preset condition;
   wherein the shortcut function icon corresponding to the game application comprises a screen-off hang-up icon and the computer program, when executed by the processor, further causes the processor to:
      receive an operation signal applied to the screen-off hang-up icon; and
      perform, in response to the operation signal, a screen-off hang-up function corresponding to the screen-off hang-up icon, wherein the screen-off hang-up function allows performing a hang-up operation while a terminal is in a screen-on state; wherein when the screen-off hang-up function is enabled, the terminal is in a locked state, and the terminal only responds to a touch signal used to release the locked state; and wherein during execution of the screen-off hang-up function, transparency and/or brightness of the user interface of the game application is decreased.

* * * * *